US007693649B2

(12) United States Patent
Groer et al.

(10) Patent No.: US 7,693,649 B2
(45) Date of Patent: Apr. 6, 2010

(54) MONITORING UNIT STATE CHART AND A DEBOUNCE LOGIC

(75) Inventors: Frank S. Groer, Stuttgart (DE); Tomislav I. Golub, Birmingham, MI (US)

(73) Assignee: Detroit Diesel Corporation, Detroit, MI (US)

( * ) Notice: Subject to any disclaimer, the term of this patent is extended or adjusted under 35 U.S.C. 154(b) by 64 days.

(21) Appl. No.: 11/939,997

(22) Filed: Nov. 14, 2007

(65) Prior Publication Data
US 2008/0162025 A1 Jul. 3, 2008

Related U.S. Application Data

(60) Provisional application No. 60/877,928, filed on Dec. 29, 2006.

(51) Int. Cl.
*G06G 7/64* (2006.01)
(52) U.S. Cl. .......................... 701/115; 123/488; 60/277
(58) Field of Classification Search ......... 701/102–104, 701/111–112, 114–115, 29, 31, 34–35, 54, 701/87; 702/58, 183, 185; 123/479, 488; 60/274, 276, 277, 285, 286
See application file for complete search history.

(56) References Cited

U.S. PATENT DOCUMENTS

| 4,302,815 | A | 11/1981 | Tedeschi et al. |
| 6,157,671 | A | 12/2000 | Young |
| 6,317,458 | B1 | 11/2001 | Boggs et al. |
| 6,321,728 | B1 * | 11/2001 | Ohkuma ..................... 123/520 |
| 6,339,742 | B2 * | 1/2002 | Weisman, II ................ 701/114 |
| 6,411,888 | B1 | 6/2002 | Weisman, II |
| 6,492,818 | B1 | 12/2002 | Downs |
| 6,810,366 | B2 | 10/2004 | Kendrick et al. |
| 6,876,097 | B2 | 4/2005 | Thomas et al. |
| 6,885,932 | B2 * | 4/2005 | Liu et al. ..................... 701/103 |
| 6,999,869 | B1 * | 2/2006 | Gitlin et al. ................. 701/115 |
| 7,078,872 | B2 | 7/2006 | Bertsch et al. |
| 7,095,238 | B2 * | 8/2006 | Steinruecken et al. ....... 324/509 |
| 7,103,460 | B1 * | 9/2006 | Breed .......................... 701/29 |
| 7,143,580 | B2 | 12/2006 | Ge |
| 7,349,798 | B2 * | 3/2008 | Beyene ....................... 701/115 |
| 7,480,559 | B2 * | 1/2009 | Groer ......................... 701/114 |
| 2007/0019707 | A1 | 1/2007 | Gozloo et al. |

\* cited by examiner

*Primary Examiner*—Stephen K Cronin
*Assistant Examiner*—Johnny H Hoang
(74) *Attorney, Agent, or Firm*—Bill C. Panagos; Rader, Fishman & Grauer PLLC

(57) ABSTRACT

A method of logging faults in an electronic controlled internal combustion engine that passes any fault readings through a debounce logic to determine whether the fault indication is real.

2 Claims, 4 Drawing Sheets

MONITORING UNIT STATE CHART AND A DEBOUNCE LOGIC

CROSS-REFERENCE TO RELATED APPLICATIONS

The present application claims priority to U.S. Provisional Application Ser. No. 60/877,928 filed on Dec. 29, 2006, the contents of which are incorporated herein in their entirety.

BACKGROUND OF THE INVENTION

1. Field of the Invention

The present invention relates to a method of logging faults in memory in an electronic controlled internal combustion engine having an electronic control unit with memory.

The present invention further relates to a method of filtering data signals through a debounce logic to filter erroneous fault signals.

2. Description of Related Art

Young U.S. Pat. No. 6,157,671 discloses a circuit for digitally monitoring a duty cycle of a pulse width modulated signal. The circuit includes s counter portion, a digital filter, and a data storage device. The counter portion is connectable to receive the pulse width modulated signal and is operable to monitor the pulse width modulated signal for a predetermined time period during which account value is established. The digital filter is connected to receive the count value established by the counter portion and is also connected to receive a stored count value from the storage device, the digital filter being operable to establish a filtered count value based upon the count value and the stored count value input thereto. The storage device is connected to receive the filtered count value established by the digital filter. Multiple pwm signals may also be monitored by including multiple counters, multiple storages devices, and one or more multiplexers.

Downs U.S. Pat. No. 6,492,818 discloses an apparatus for determining component fault conditions associated with a capacitive discharge ignition system for an internal combustion engines and includes a number of AC coupling circuits connected to a spark detection circuit, wherein the combination is responsive to a corresponding number of primary coil voltage signals to produce digital pulses indicative of recorded spark events from various secondary coils in the respective primary coils of the ignition system. A number of level shifting circuits are also included and provide a pulse width circuit with a corresponding number of level-shifted primary coil voltage signals. A pulse width circuit is responsive to the number of level-shifted primary coil voltage signals to produce appropriate digital pulses time d to match the non-zero voltage times of the various primary coil voltage signals. A voltage processing circuit is responsive to the digital signals produced by the spark detection circuit and the pulse width circuit to determine spark breakdown voltage, shorted ignition coils, worn ignition plugs, shorted ignition plugs, ignition control module faults and external arcing conditions. These faults are communicated to a service technician via a display and/or by logging such faults in memory.

Kendrick et al. U.S. Pat. No. 6,810,366 discloses apparatuses and methods for filtering a signal. A first processing device receives a first control signal and a first feedback signal and transmits a first error signal as a function of those signals. A second processing device receives the first error signal and transmits a second control signal as a function of the first error signal, a deadband, and a gain factor. A third processing device receives the second control signal and the first feedback signal and transmits an output signal as a function of those signals. A fourth processing device receives the out signal and transmits the first feedback signal as a function of the output signal to the first processing device and the third processing device, the first feedback signal being substantially equal to the output signal delayed by a first predetermined duration of time.

BRIEF SUMMARY OF THE INVENTION

The present invention is directed to a method of logging faults in an electronic controlled internal combustion engine having an electronic control unit with memory. The electronic control unit may comprise a motor control module in electronic communication with at least one sensor to provide data signals including vehicle operating conditions, and a Common Powertrain Controller in electronic communication with the Motor Control Module. Both the Motor Control Module and the Common Powertrain Controller may be equipped with a fault code memory manager for logging faults. The method includes the steps of;

sensing engine operating condition and transmitting a data signal indicative of said engine operating conditions to said electronic control unit;

filtering said data signals from said sensor through a debounce logic; said logic comprising a timer to measure time duration of an error in said data signal; a recovery time for any deactivation of an error and a healing time for an inactive fault self deletion; and logging any faults after debounce filtering in a fault control module and activating any alerts indicating said faults.

The motor control module faults monitoring units are updated once per second, and the Common Powertrain Controller includes monitoring units that may be evaluated up to 10 times per second. When a fault is logged, the engine may reduce at least one of engine torque or engine speed.

DETAILED DESCRIPTION OF THE INVENTION

Figure 1:
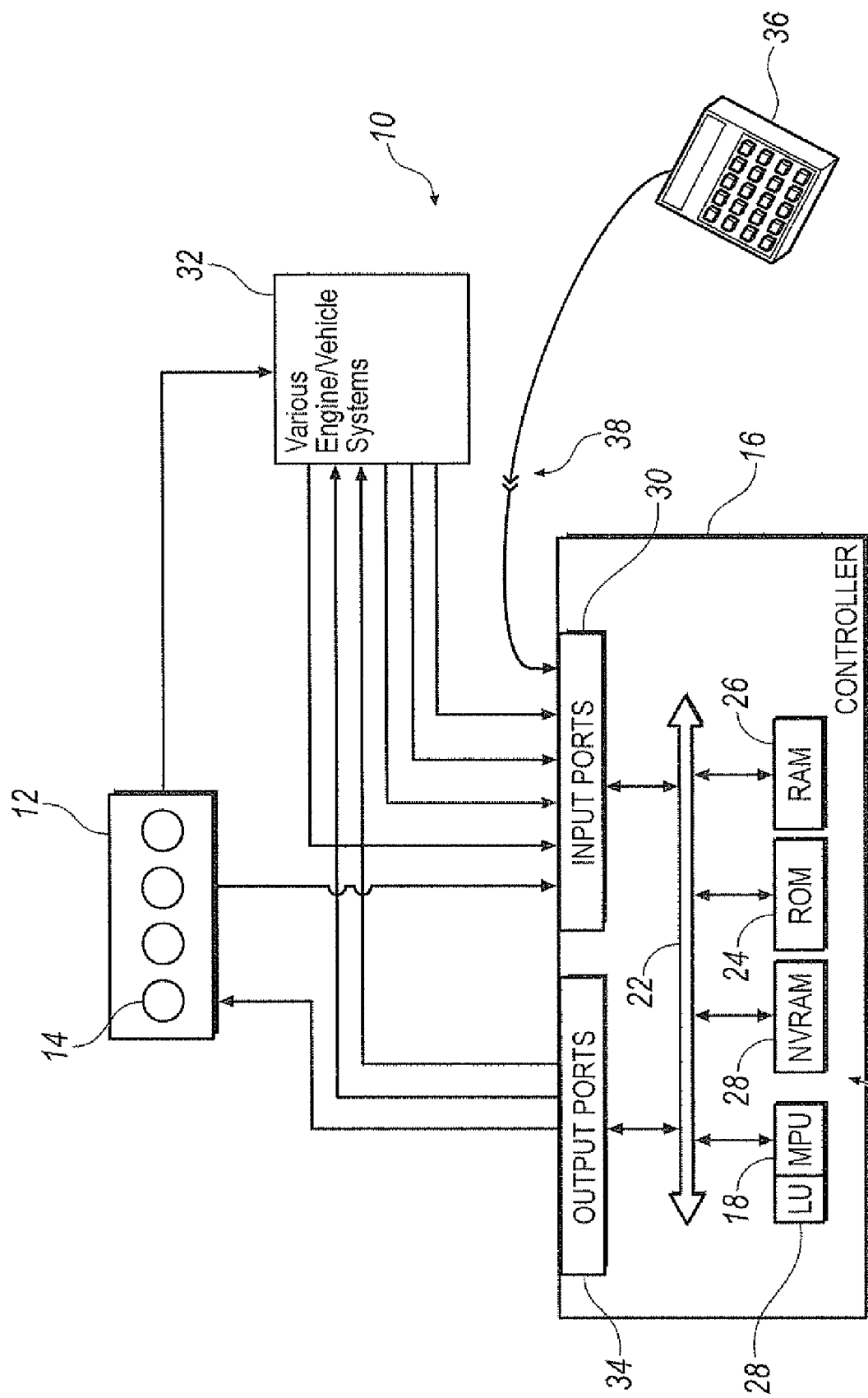
FIG. 1 is a schematic representation of an internal combustion engine, an electronic controller, and various systems.

Turning now to the drawings where like numerals depict like structures and particularly to FIG. 1, there is schematically represented a diagrammatic view illustrating a compression-ignition internal combustion engine system 10 incorporating various features according to the present invention is shown. The engine 12 may be implemented in a wide variety of applications including on-highway trucks, construction equipment, marine vessels, stationary generators, pumping stations, and the like. The engine 12 generally includes a plurality of cylinders disposed below a corresponding cover, indicated generally by reference numeral 14.

In a preferred embodiment, the engine 12 is a multi-cylinder compression ignition internal combustion engine, such as a 3, 4, 6, 8, 12, 16, or 24 cylinder diesel engine. However, the engine 12 may be implemented having any appropriate number of cylinders 14, the cylinders having any appropriate displacement and compression ratio to meet the design criteria of a particular application. Moreover, the present invention is not limited to a particular type of engine or fuel. The present invention may be implemented in connection with any appropriate engine (e.g., Otto cycle, Rankin cycle, Miller cycle, etc.) using an appropriate fuel to meet the design criteria of a particular application.

A controller 16 preferably comprises a programmable microprocessor 18 in communication with (i.e., coupled to) various computer readable storage media 20 via at least one data and control bus 22. The computer readable storage media 20 may include any of a number of devices such as read only memory (ROM) 24, random access memory (RAM) 26, and non-volatile (keep-alive) random access memory (NVRAM) 28.

The various types of computer-readable storage media 20 generally provide short-term and long-term storage of data (e.g., at least one lookup table, LUT, at least one operation control routine, at least one mathematical model for EGR control, etc.) used by the controller 16 to control the engine 10. The computer-readable storage media 20 may be implemented by any of a number of known physical devices capable of storing data representing instructions executable by the microprocessor 18. Such devices may include PROM, EPROM, EEPROM, flash memory, and the like in addition to various magnetic, optical, and combination media capable of temporary and permanent data storage.

The computer-readable storage media 20 may include data representing program instructions (e.g., software), calibrations, routines, steps, methods, blocks, operations, operating variables, and the like used in connection with associated hardware to control the various systems and subsystems of the engine 10, and the vehicle. The computer readable storage media 20 generally have instructions stored thereon that may be executable by the controller 16 to control the internal combustion engine 10. The program instructions may direct the controller 16 to control the various systems and subsystems of the vehicle where the engine 12 is implemented, with the instructions being executed by microprocessor 20, and optionally, instructions may also be executed by any number of logic units 28. The input ports 30 may receive signals from the various engine and vehicle systems, including sensors and switches generally designated at 32, and the controller 16 may generate signals (e.g., the signals ACT and ADJ) at output ports 34. The output signals are generally presented (or transmitted) to the various vehicle components.

A data, diagnostics, and programming interface 36 may also be selectively connected to the controller 32 via a bus and connector 38 to exchange various information therebetween. The interface 36 may be used to change values within the computer readable storage media 20, such as configuration settings, calibration variables, and the like.

As used throughout the description of the present invention, at least one selectable (i.e., programmable, predetermined, modifiable, etc.) constant, limit, set of calibration instructions, calibration values (i.e., threshold, level, interval, value, amount, duration, etc.) or range of values may be selected by any of a number of individuals (i.e., users, operators, owners, drivers, etc.) via a programming device, such as the device 36 selectively connected via an appropriate plug or connector 38 to the controller 16.

Rather than being primarily controlled by software, the selectable or programmable constant and limit (or range) values may also be provided by an appropriate hardware circuit having various switches, dials, and the like. Alternatively, the selectable or programmable limit and range may also be changed using a combination of software and hardware without departing from the spirit of the present invention. However, the at least one selectable value or range may be predetermined and/or modified by any appropriate apparatus and method to meet the design criteria of a particular application. Any appropriate number and type of sensors, indicators, actuators, etc. may be implemented to meet the design criteria of a particular application.

In at least one mode of operation, the controller 16 may receive signals from the various vehicle sensors and switches, and execute control logic embedded in hardware and software to control the engine 12, various engine and vehicle systems 32, and the like. In one example, the controller 16 is implemented as at least one implementation of a DDEC controller available from Detroit Diesel Corporation, Detroit, Mich. Various other features of the DDEC controller are described in detail in a number of different U.S. patents assigned to Detroit Diesel Corporation. However, the present invention may be implemented in connection with any appropriate controller to meet the design criteria of a particular application.

Control logic may be implemented in hardware, firmware, software, or combinations thereof. Further, control logic may be executed by the controller 16, in addition to and by any of the various systems and subsystems of the vehicle or other installation where the controller 16 is implemented. Yet further, although in a preferred embodiment, the controller 16 includes the microprocessor 20, any of a number of known programming and processing techniques, algorithms, steps, bocks, processes, routines, strategies and the like may be implemented to control the engine 12, and the various engine and vehicle components 32. Further, the engine controller 16 may receive information in a variety of ways. For example, engine 12 systems information may be received over a data link, at a digital input, or at a sensor input of the engine controller 16.

Figure 2:
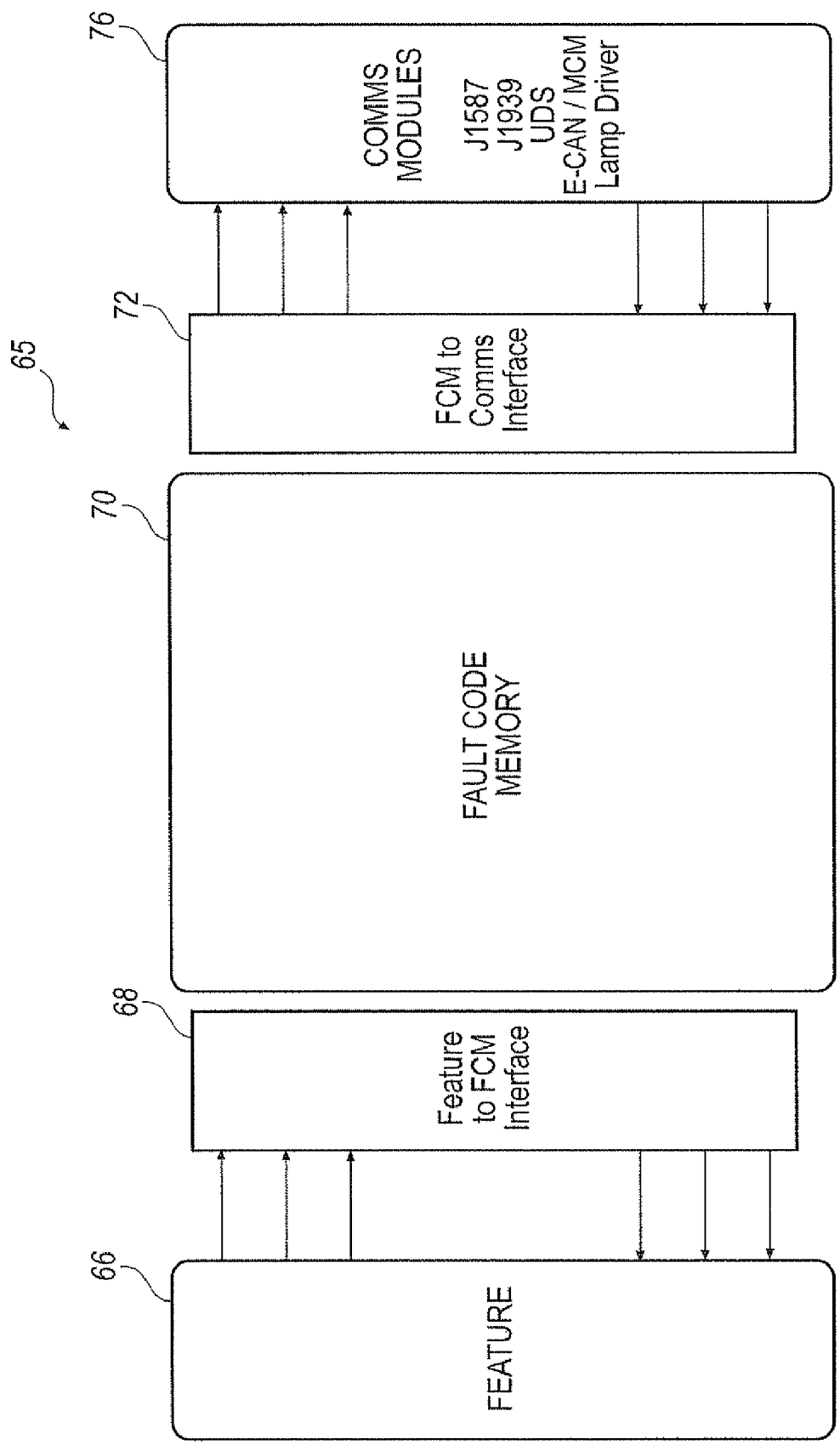
FIG. 2 is a is a schematic representation of an electronic controller depicting some of the internal organization.

FIG. 2 is a schematic representation of the controller 16 of the present invention. The controller has a Motor Control Module 40 and a Common Powertrain Controller 42. Each of the Common Powertrain Controller and the Motor Control Module has memory for storage and retrieval of operating software and faults. The Motor Control Module and the Common Powertrain Controller communicate with each other via the Engine Controller Area Network (ECAN) 44. It is contemplated that any electronic communication between the Motor Control Module (MCM) and the Common Powertrain Controller is acceptable to communicate static faults stored in either, so that each has the most current version of the faults in the other module at any time. The Common Powertrain Controller communicates with the vehicle systems such as lamps and gauges 46, instrument cluster 48, and tool/instrument 50. The CPC2 communicates with the instrument cluster and the tool/instrument via an SAE data link J1939 and J 1587, (52 and 54, respectively). CPC2 outputs 56 are communicated to the lamps and gauges, and the CPC2 communicates with the diagnostic tool 36 over a UDS/CPC2 link 58. The CPC2 further acts as a gateway for the MCM to communicate with the diagnostic tool 36 over a UDS link/MCM 60 through the MCM gateway 62 in the CPC2. The MCM communicates to the gateway via a UDS CPC/MCM tuunel 64 and from there, communication is possible with the diagnostic tool.

Figure 3:
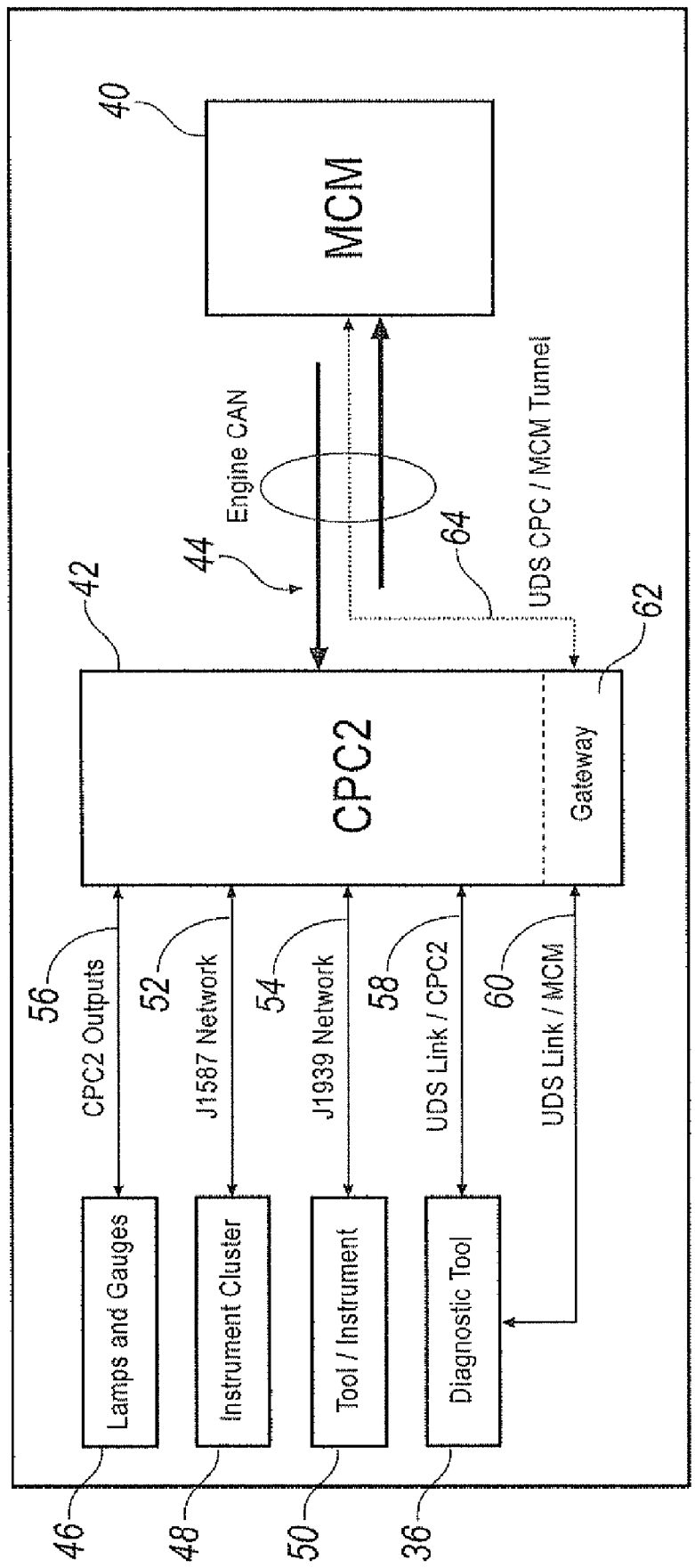
FIG. 3 is a schematic representation of a Fault Code Memory Module resident in a Common Powertrain Controller as described in FIG. 2.

FIG. 3 is a schematic representation of the fault code memory manager resident in the CPC2. A similar Fault Code Memory Manager Module may be resident in the MCM. The fault code memory manager tracks and stores faults in memory that are received by each MPU 18 (as seen in FIG. 1) and a system that the MPU is monitoring. Those skilled in the art will recognize that while only one MPU is schematically presented in FIG. 1, it is understood that multiple MPUs may be present, each MPU monitoring a different system of the vehicle or engine, such as EGR, Engine Speed, Engine Torque, Engine coolant temperature, Engine Boost Pressure, Engine Percent Load, Vehicle Speed as well as other engine operating systems and parameters.

The Fault Code Manager Administrator Module 65 interfaces to the individual features 66 through an interface 68 to evaluate conditions and periodically provide status of each individual fault condition. These fault conditions are indicated by fault condition status flags, and are then processed and debounced in the Fault Code Module 70 internal logic based upon a configurable set or other rules. Once the faults are logged, they are kept and maintained in memory in a fault table which can then sent out on all communication links through the communications link 72 to the modules such as the CPC 2, or the MCM, or both, designated as 76. This communication may be over J 1587/11939 SAE data links, or the ECAN, or a UDS link. Additional interfaces back to features and LOR module allows the engine system behavior to change depending on the active faults. The FCM system component may include any number of monitoring units (MU) and preferably, the CPC2 Fault Control Module contains approximately 200 CPC2 defined MUs and any number of monitoring units (MU) in the MCM, and preferably approximately 500 MCM defined MUs. The faults are debounced prior to being transmitted to ensure that each fault is indicative of current operating conditions, and not an error or an anomaly. The MCM debounced faults are updated once per second via the EeAN, and the CPC2 MUs are internally evaluated 10 times per second.

The system has a range of fault logging and handling capabilities, including at least one of Fault Identification, such as Monitoring Unit Identifier internally unique Fault Identifier, KWP path/type, Universal Diagnostic Service Identification, SPN (J1939 ID)/FMI, Flash code (lamp blink code) and fault name/description via a UDS tool, Environmental Conditions such as specified feature sponsor, exclusion conditions, Fault Debounce Timer types, such as none, or ramp/rest or integrating, debounce timers, such as debounce time (fault activation) recovery time (fault deactivation) healing time (inactive fault self deletion) lamp control for each MU, such as a buzzer, SEL, CEL, MIL, and Engine control, such as torque reduction and engine protection shutdown protection.

Low priority faults are not sent to the lamps over the communications links. Normally, these low priority faults are used in internal control logic but should not necessarily be shown to the vehicle operator. Preferably, lamp control on the dash board is handled separately and defined individually on per fault/per lamp basis. Preferably the system contemplates the following Communications Visibility Semaphore: Active Fault SENT, Inactive Fault Sent results in fault visibility for a majority of faults. Active Fault NOT SENT, Inactive Fault SENT results in fault which do not illuminate the lamps. Active Fault SENT, Inactive Fault NOT SENT results in no fault defined at the moment. Active Faults NOT SENT, Inactive Faults NOT SENT results in full invisibility of Faults, indicative of none for the moment.

The architecture of the present invention provides a snapshot of data record that includes, but is not limited to seconds active counter, seconds inactive counter, First Occurrence Date/Time Stamp (1 second), First Occurrence Engine Hour Stamp (1 second), Last Occurrence Date/Time Stamp (1 second) Last Occurrence Engine Hour Stamp (1 second) Engine and Vehicle Data, including engine RPM, engine torque, engine coolant temperature, engine boost pressure, engine percent load, vehicle speed, and number of SEO events. The present invention further indicates communications link failures, Fault code memory MCM link failure faults, Non volatile storage rated failures, such as checksum faults, Engine data Faults based upon the MCM warning level information, including oil level, oil pressure, coolant temperature, input/output related faults, such as analog inputs such as shorted or open circuit detection (both ground and battery), digital outputs such as open circuit, short to battery, short to ground, and rationality faults, such as the diesel particulate filer switch, and remote Power Take Off request switch.

Figure 4:
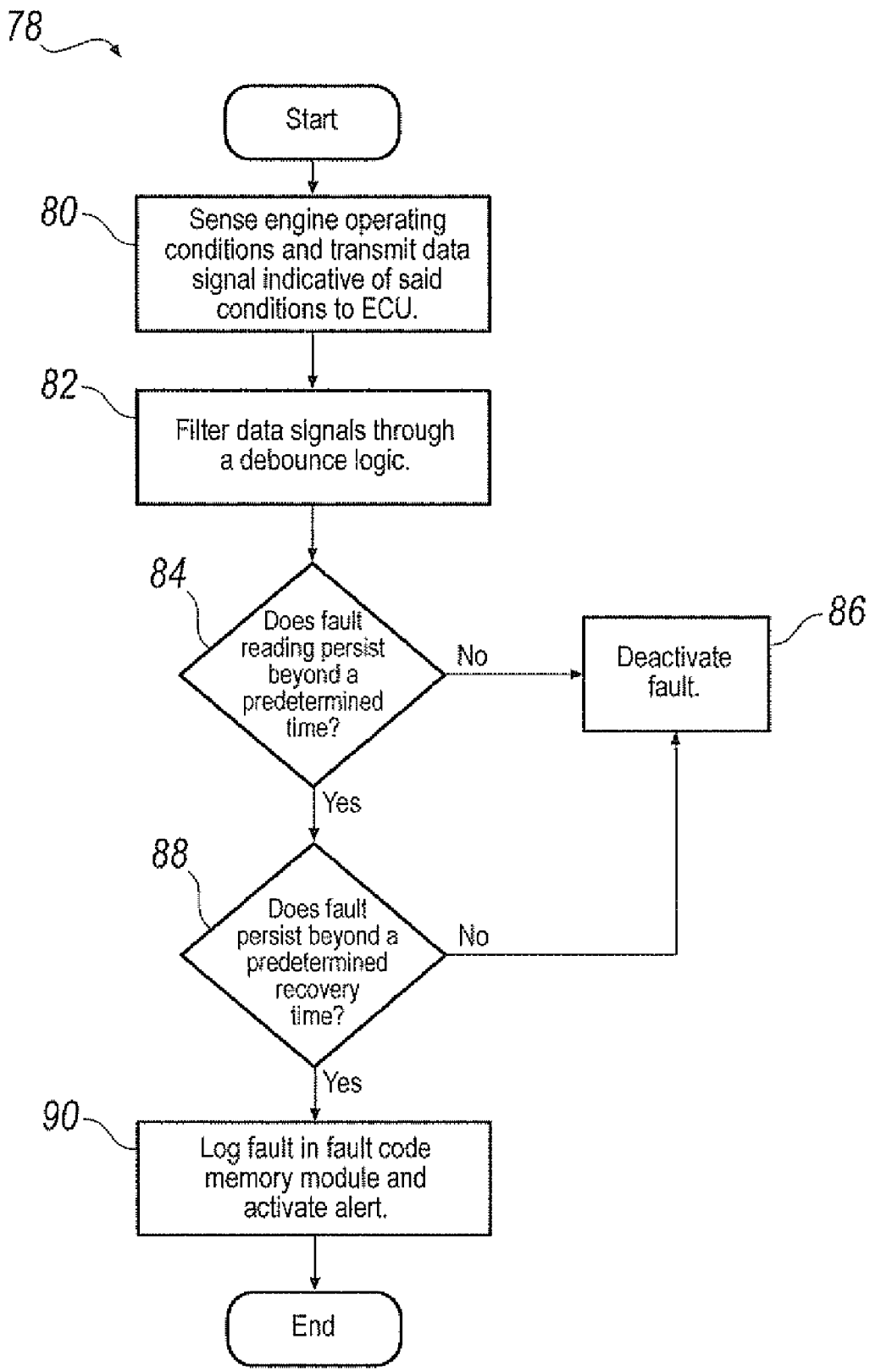
FIG. 4 is a schematic representation of the software flow chart of one method according to the present invention.

FIG. 4 is a schematic representation of a software flowchart of one method 78 according to the present invention. Step 80 is sensing engine operating conditions and transmitting data signals indicative of the engine operating conditions to the Electronic Control Unit. In this regard, it is noted that, as set forth above, many different engine operating parameter may be sensed and those signals transmitted to the ECU. Step 82 is filtering the data signals through a debounce logic. The debounce logic begins at step 84 by determining whether a fault reading persists beyond a predetermined period of time. If no, step 86 is deactivate the fault code flag. If yes, step 88 is determining whether the fault persists beyond a predetermined recovery time. If not, the software loops back to step 86. If yes, step 90 is logging the fault in the Fault Code Memory Manager. An alert may also be activated upon storage of the fault in memory.

While one aspect of the invention has been described, it is understood that the words used are words of description, and not words of limitation. Many variations and modifications are possible without departing from the scope and spirit of the invention as set forth in the appended claims.

What is claimed as new and desired to be protected by Letters Patent of the United States is:

1. A method of logging faults in an electronic controlled internal combustion engine having an electronic control unit with memory, said electronic control unit comprising a motor control module in electronic communication with at least one sensor to provide data signals including vehicle operating conditions; said motor control module in electronic communication with a Common Powertrain Controller; said Common Powertrain Controller further equipped with a fault manager for logging said faults, said method comprising:

sensing engine operating conditions and transmitting a data signal indicative of said engine operating conditions to said electronic control unit;

filtering said data signals from said sensor through a debounce logic; said logic comprising a timer to measure time duration of an error in said data signal; a recovery time for any deactivation of an error and a healing time for an inactive fault self deletion;

logging any faults after debounce filtering in memory in a fault table in a fault control module;

commanding said faults from said fault control memory up to 10 times per second to said Common Powertrain Controller and once per second to said motor control module; and activating any alerts indicating said fault.

2. The method of claim 1, wherein logging of faults causes said engine to reduce at least one of engine torque or engine speed.

* * * * *